(12) United States Patent
Townes

(10) Patent No.: US 7,198,466 B2
(45) Date of Patent: Apr. 3, 2007

(54) BLADE COOLING

(75) Inventor: Roderick M Townes, Derby (GB)

(73) Assignee: Rolls-Royce plc, London (GB)

( * ) Notice: Subject to any disclaimer, the term of this patent is extended or adjusted under 35 U.S.C. 154(b) by 351 days.

(21) Appl. No.: 10/720,333

(22) Filed: Nov. 25, 2003

(65) Prior Publication Data
US 2005/0226725 A1 Oct. 13, 2005

(30) Foreign Application Priority Data
Nov. 28, 2002 (GB) .................. 0227745.7

(51) Int. Cl.
F01D 5/18 (2006.01)
(52) U.S. Cl. .................... 416/96 R; 416/179
(58) Field of Classification Search ............. 416/96 R, 416/219 R, 95, 97 R, 179, 248
See application file for complete search history.

(56) References Cited

U.S. PATENT DOCUMENTS

| 2,440,069 | A |  | 4/1948 | Bloomberg |  |
| 4,178,129 | A |  | 12/1979 | Jenkinson |  |
| 4,275,990 | A |  | 6/1981 | Langley |  |
| 4,348,157 | A |  | 9/1982 | Campbell |  |
| 4,626,169 | A | * | 12/1986 | Hsing et al. | ............... 416/95 |
| 4,820,123 | A |  | 4/1989 | Hall |  |
| 5,403,156 | A | * | 4/1995 | Arness et al. | ............. 416/96 R |
| 5,827,043 | A |  | 10/1998 | Fukuda |  |
| 6,059,529 | A | * | 5/2000 | Schiavo | ............. 416/96 R |
| 6,474,946 | B2 | * | 11/2002 | Kildea | ............. 416/97 R |
| 6,981,845 | B2 | * | 1/2006 | Balland et al. | ............. 416/96 R |

FOREIGN PATENT DOCUMENTS

| DE | 3 835 932 A | 4/1990 |
| GB | 2 225 063 A | 5/1990 |

* cited by examiner

Primary Examiner—Edward K. Look
Assistant Examiner—Nathan Wiehe
(74) Attorney, Agent, or Firm—W. Warren Taltavull; Manelli Denison & Selter PLLC

(57) ABSTRACT

In order to couple coolant air flow presented through a coolant gallery 4, 24 through an opening 7, 27 into a passage 8, 28 a flow deflector 6, 26 is provided. The flow deflector 6, 26 progressively deflects the coolant air flow 5, 25 through the opening 7, 27 such that there is reduced loss in coolant flow 5, 25 pressure.

7 Claims, 2 Drawing Sheets

BLADE COOLING

FIELD OF THE INVENTION

The present invention relates to blade cooling and more particularly to arrangements for feeding coolant from a mounting disk or hub to turbine blades in a jet engine.

BACKGROUND OF THE INVENTION

Cooling of turbine blades in a jet engine is important in order to maintain structural integrity whilst the blades operate at high temperatures approaching if not exceeding the melting point of the materials from which the blades are made. Turbine blades generally include a coolant passage network within their structure within which coolant air circulates in order to cool the blade. Such coolant air must be coupled to the coolant passage network within the blade. Generally, a central coolant supply system is coupled to the blade coolant passage network. Traditionally, a specific connecting hole or passage has been made in the mounting hub or disk to which the turbine blade is secured such that an opening in that blade is substantially aligned with the feed hole or passage in the mounting disk in order to present coolant to the blade coolant passage network. Fabrication of such feed holes in the mounting disk as well as reciprocal holes in the root or connecting end of the blade add significantly to fabrication costs as well as increased mechanical stress levels and their requirement for thicker material. Alternatively, a space can be created between the root end of the blade and the top surface of the mounting disk or hub. This space acts as a distribution gallery for openings connected to a coolant passage network of a blade. These distribution galleries are commonly referred to as a "bucket groove". Essentially, within the distribution gallery there is a positive pressure differential such that coolant air presented at one end is drawn into the openings for the coolant passage network of the blade. Unfortunately, coolant flow in a distribution gallery is turned sharply at least twice as it passes to the coolant passage network of the blade. Such turning can diminish the pressure differential and so flow rate of coolant air into the blade cooling passage network. Clearly, a reduce flow rate will diminish cooling efficiency and therefore performance.

SUMMARY OF THE INVENTION

In accordance with the present invention, there is provided a blade cooling arrangement comprising a coolant gallery formed between a mounting hub and a blade root including at least one coolant passage opening and a flow deflector associated with that passage opening to deflect in use a coolant flow through the coolant gallery towards that passage opening.

Also in accordance with the present invention there is provided a flow deflector for a turbine blade, the deflector in use being arranged in a coolant gallery between a mounting hub and a blade root, the deflector associated with a coolant passage opening to deflect coolant flow in the gallery towards the passage opening whereby such deflection is progressive in order to limit coolant flow pressure loss upon entry through the coolant passage opening.

Preferably, the flow deflector is a curved scoop to progressively deflect the coolant flow towards the passage opening. Alternatively, the flow deflector is a ramp or wedge to lift coolant flow towards the passage opening to achieve angular flow overlap. Possibly, there is a plurality of flow deflectors to progressively deflect coolant flow towards the passage opening.

Possibly, the flow deflector extends upwards from the mounting hub towards the passage opening. Alternatively, the flow deflector extends downwardly from the blade root away from the passage opening.

Possibly, the flow deflector is adjustable dependent upon temperature or specific requirements. Typically, such adjustment is by variation in material dimensions as a result of differential expansion and/or contraction relative to the mounting cup and/or the blade root. Alternatively, such adjustment may be through mechanical displacement under specific control by a control device.

Further in accordance with the present invention there is provided an engine including turbine blades having a blade cooling arrangement or a flow deflector as described above.

BRIEF DESCRIPTION OF THE DRAWINGS

Embodiments of the present invention will now be described by way of example only with reference to the accompanying drawings in which.

DETAILED DESCRIPTION OF THE INVENTION

Figure 1:
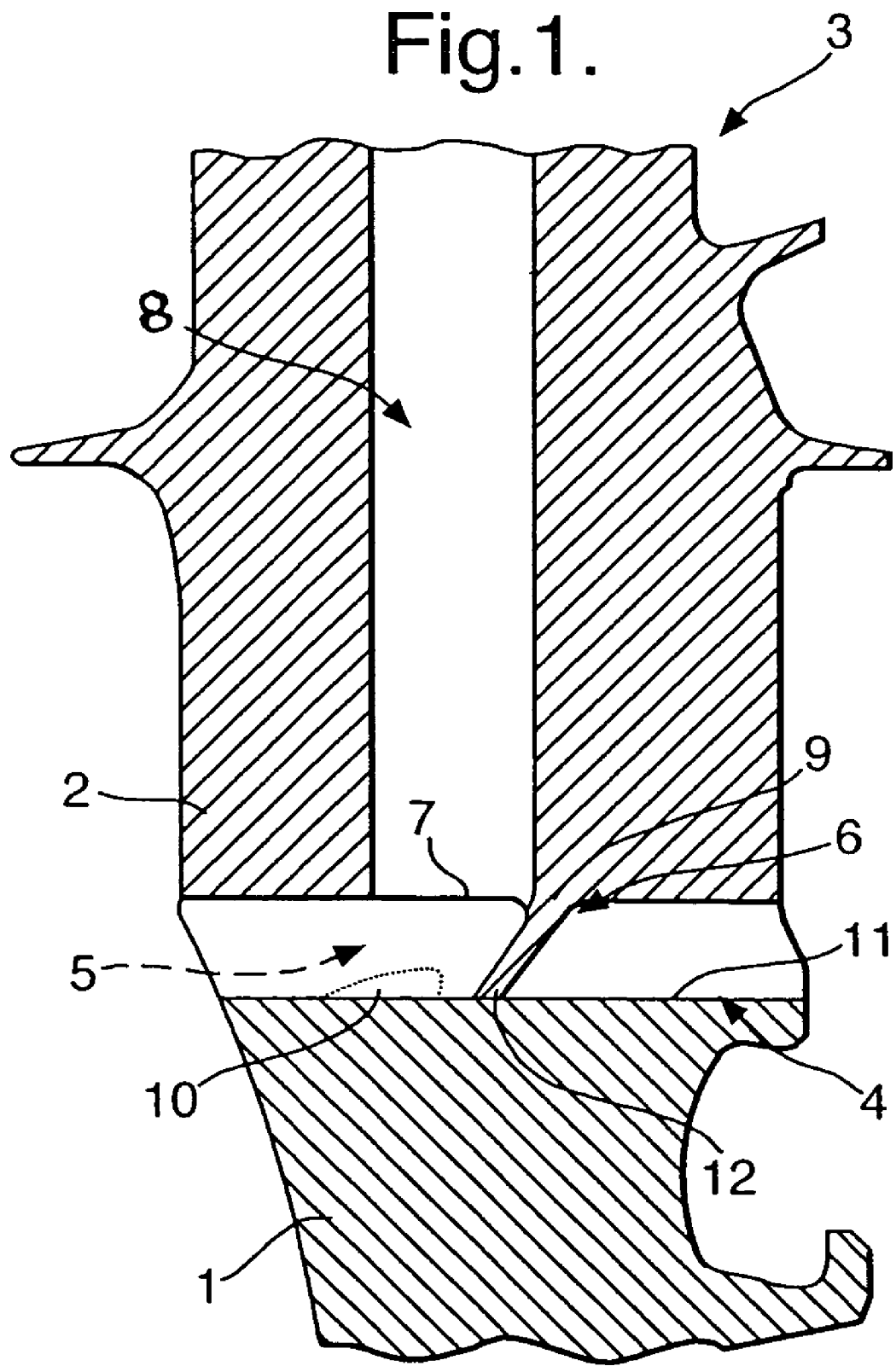
FIG. 1 is a schematic cross-section of a first embodiment of the present invention.

Referring to FIG. 1 illustrating a first embodiment of a cooling arrangement in accordance with the present invention. Thus, a mounting hub or disk 11 has a turbine blade 3 secured adjacent to it with a gap or coolant distribution gallery 4 between a mounting or root end 2 of the blade 3 and a top surface 11 of the mounting disk 1. A coolant flow illustrated by broken arrow 5 is drawn into the gallery 4 from a coolant supply system under a positive pressure differential. The gallery 4 has a passage opening 7 which extends to a passage 8 coupled to a coolant passage network within the blade 3 to provide cooling of that blade 3.

In accordance with the present invention a flow deflector 6 located adjacent and around the opening 7 deflects the coolant flow 5 into the passage 8 through the opening 7. The deflector 6 is substantially flat and creates a wedge or ramp to progressively deflect the coolant flow 5 through the opening 7. In such circumstances, there is less direct or perpendicular collision by the coolant flow onto the deflector 6 such that a diminution in the net positive pressure drawing the coolant flow 5 through the gallery 4 into the passage 8 is not significantly diminished. The flow deflector 6 essentially acts as a scoop for coolant air flow 5 into the passage 8.

As indicated above, the flow deflector 6 is located substantially around the hole or passage opening 7 such that coolant air flow can pass either side of the deflector 6 to become incident upon other flow deflectors in the gallery 4.

As illustrated in FIG. 1, the flow deflector 6 substantially extends to the top surface 11 of the mounting hub or disk 1. However, the flow deflector may be normally spaced above that surface 11 in order to accommodate variations in deflector 6 dimensions such that an end 12 is not forced in excessive compressive engagement with the surface 11 causing mechanical stress particularly about a mounting end 9 of the deflector 6. It will also be understood that the mounting end 9 may be made relatively flexible in order to provide for pivoting to accommodate for such expansion or contraction due to temperature changes in the blade root end 2 and mounting disk 1. Furthermore, this mounting end 9 could be designed such that temperature changes create variable deflection of the flow deflector 6 in order to vary the inclination dependent upon temperature and so degree of coolant flow deflection into the passage 8.

As illustrated in FIG. 1 the flow deflector 6 is mounted upon the blade root end 2. The flow deflector 6 can be formed by machining or casting during formation of the turbine blade 3. Possibly, a sacrificial ceramic insert may be placed in the opening 7 upon which the flow deflector 6 is formed and then the sacrificial insert removed. Alternatively, it will be appreciated that the flow deflector 6 could be part of the mounting hub or disk upper surface 11 but then care must be taken with regard to ensuring appropriate location relative to the opening 7 to provide operational association in order to deflect the coolant flow 5 progressively into the passage 8. It will also be understood that separate flow deflector components could be formed as inserts which are appropriately secured within the gallery 4 for correct association with the opening 7 in order to progressively deflect the coolant flow 5 into the passage 8.

It is an objective of the flow deflector 6 in accordance with the present invention to provide progressive deflection of the coolant flow 5. Thus, a number of flow deflectors could be utilised in order to act in concert such that there is gentle and progressive deflection of the coolant flow with limited positive pressure loss upon entry to the passage 8 through the opening 7. It will be understood that air coolant flow through the passage 8 and then into the coolant passage network of the blade 3 is highly determinant of the cooling efficiency within that blade 3. In such circumstances, a greater degree of cooling may be achieved to allow the blade to operate at higher temperatures and therefore an associated engine to work more efficiently. Alternatively, a lower volume of coolant air may be necessary in order to provide a required level of cooling for engine operation and such a lower volume of air coolant flow will also improve pro rata engine efficiency.

A number of flow deflectors may be provided to cause deflection. Thus, a primary flow deflector marked by a dotted line and numeral 10 may be provided in order to create initial coolant flow deflection which is further deflected by the flow deflector 6. However, care should be taken that the impingement by the flow deflector 10 does not create a throttle choking effect by diminishing the cross-sectional area of the gap between the top of the deflector 10 and the bottom of the blade root end 2. The flow deflector 10 may comprise a material which expands in order to create the wedge or ramp shape depicted in FIG. 1 with temperature such that initially the flow deflector 10 has a slight angular inclination or even flat aspect relative to the coolant flow 5 but with temperature the flow deflector 10 rises in order to provide further coolant air flow 5 deflection through the opening 7 into the passage 8. Where appropriate, mechanical linkages may be provided for the flow defectors 6, 10 in order to vary the angular inclination of these flow deflectors 6, 10 dependent upon temperature or specific requirements through a central controller.

Figure 2:
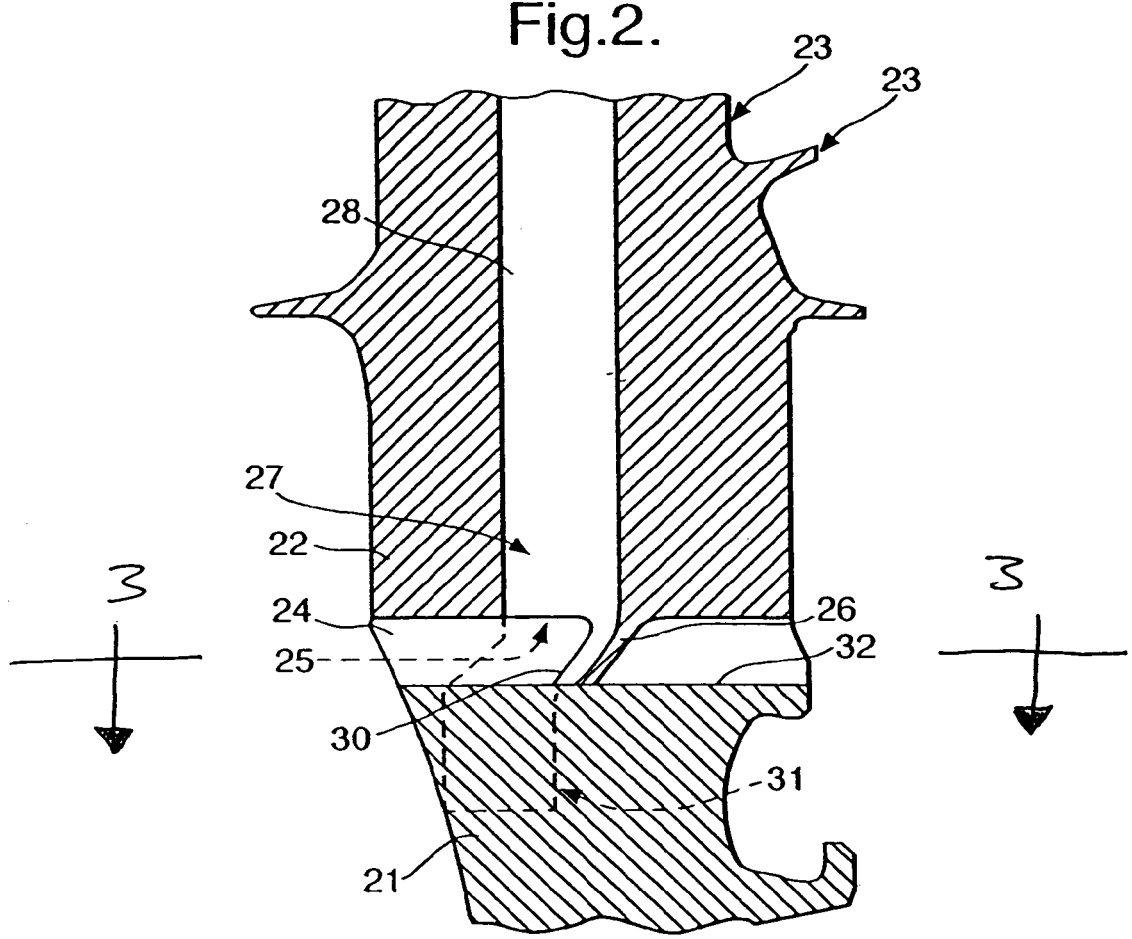
FIG. 2 is a schematic cross-section of a second embodiment of the present invention; and, FIG. 3 is a cross-section of a flow deflector in the plane 3—3 depicted in FIG. 2.
Figure 3:
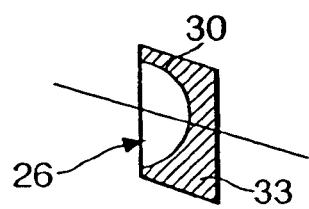

FIGS. 2 and 3 illustrate a second embodiment of the present invention. Thus, in a similar arrangement to that depicted in FIG. 1 a mounting hub or disk 21 has a turbine blade 23 secured to it with a gap between a blade root end 22 and a top surface 32 of the mounting hub or disk 21. This gap is a coolant gallery 24 through which a coolant flow shown by arrow head 25 passes in order to enter through a passage opening 27 a passage 28 coupled to a coolant passage network of the turbine blade 23. The coolant air flow 25 is deflected by a flow deflector 26 associated and adjacent to the passage opening 27. This flow deflector 26 is located substantially around the passage opening 27 to block the gallery 24 by a close fit association. However, if bypass holes are provided to the respective sides of the deflector 26, coolant air flow 25 can bypass the flow deflector 26 on either side to impinge upon other flow deflectors within the coolant gallery 24.

The flow deflector 26 has a curved surface 30 which acts as a scoop in order to progressively deflect the coolant air flow 25 through the opening 27 into the passage 28. Thus, the flow deflector 26 acts substantially in the same fashion as that described with respect to flow deflector 6 (FIG. 1) but rather than providing a flat wedge or ramp aspect to the coolant air flow 25 has a curved scoop for gradual flow deflection through the passage opening 27 into the passage 28.

Typically, as illustrated in FIG. 2 the flow deflector 26 is an integral part of the blade root end 22. The flow deflector 26 may be machined or cast with the blade root end 22 during manufacture. Possibly, a sacrificial ceramic core (shown in broken line 31) may be located within the opening 27 during casting or machining of the flow deflector 26 such that once fabrication is complete the core 31 is removed to leave the flow deflector 26 extending below the opening 27.

Normally, as illustrated in FIG. 2 the flow deflector 26 will extend substantially into contact with the upper surface 32 of the mounting hub or disk 21. Alternatively, the bottom edge of the flow deflector 26 may be spaced from the upper surface 32 to accommodate for expansion and/or contraction of the hub or disk 21 and turbine blade 23 such that overly compressive engagement is avoided and so possible detrimental stressing of the flow deflector 26 is prevented.

It will be understood that the flow deflector 26 as with flow deflector 6 (FIG. 1) could be part of the upper surface 32 of the hub or disk 21 rather than an integral part of the blade root end 22. Alternatively, the flow deflector 26 could be a separate component or insert appropriately secured in association with the opening 27 as required.

Specific choice of the angle of inclination for the wedge or ramp configuration of flow deflector 6 (FIG. 1) or the rate of curvature in the scoop flow deflector 26 will be design choices made dependent upon expected coolant air flow rates, necessary cooling efficiency and other operational factors. As indicated above, by appropriate choice of materials in terms of relative expansion/contraction, these angles of inclination and curvature may be slightly altered through a temperature range in order to adjust the degree of progressive deflection of the coolant flow into the passage leading to the coolant passage network of a turbine blade.

FIG. 3 illustrates a cross-section of the flow deflector 26 in the plane 3—3, as can be seen, the scoop or curved wall surface 30 takes the form of a cavity removed from a block cross-section 33. This enables the flow deflector 26 to partially envelope or surround the hole which defines the passage opening 27 so improving coolant air flow 25 deflection into the passage 28 through the opening 27. It will also be understood that the greater dimensions of the block 33 will render the flow deflector 26 more robust potentially in service than the flat flow deflector 6 but will also marginally increase weight for the blade 23 particularly if several flow deflectors are utilised in each blade 23.

The principal function of a flow deflector 6, 26 is to deflect a lateral coolant air flow 5, 25 along the distribution gallery 4, 24 into an opening 7, 27 which is perpendicular to that flow 5, 25. Thus, if the coolant air flow is considered a planar front, the deflector 6, 26 deflects that planar front such that there is greater overlap with the plane of the opening 7, 27 for entry. Ideally, the planar deflection should be in the order of 90° or that required for in-line incidence but normally a balance is struck between the severity of deflection (which effects net positive pressure loss) and the level of flow planar front overlap with the opening 7, 27 (alignment would be an ideal coupling of flow into the opening 7, 27 but normally the deflected flow planar front will be skew of the plane of the opening).

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A blade cooling arrangement comprising a mounting hub and a blade root having a coolant gallery formed between said hub and said root and including at least one coolant passage opening and a flow deflector associated with that passage opening to deflect coolant flow through the coolant gallery towards the passage opening wherein the flow deflector is positioned in the coolant gallery and extends from one side across said coolant gallery to engage the other side of said coolant gallery wherein there is a plurality of flow deflectors to progressively deflect coolant flow towards the passage opening.

2. An arrangement as claimed in claim 1 wherein the flow deflector has a curved surface to progressively deflect the coolant flow towards the passage opening.

3. An arrangement as claimed in claim 1 wherein the flow deflector is a ramp or wedge to lift coolant flow towards the passage opening to achieve progressive deflection of the coolant flow towards that passage opening.

4. An arrangement as claimed in claim 1 wherein the flow deflector extends upwardly from the mounting hub towards the passage opening.

5. An arrangement as claimed in claim 1 wherein the flow deflector extends downwardly from the blade root away from the passage opening.

6. An arrangement as claimed in claim 1 wherein the flow deflector is adjustable dependent upon specific requirements.

7. An arrangement as claimed in claim 6 wherein adjustment of the flow deflector is by variation in material dimensions as a result of one of differential expansion and contraction relative to one of the mounting hub and the blade root.

* * * * *